United States Patent [19]

Frezza et al.

[11] Patent Number: 4,982,430

[45] Date of Patent: Jan. 1, 1991

[54] BOOTSTRAP CHANNEL SECURITY ARRANGEMENT FOR COMMUNICATION NETWORK

[75] Inventors: William A. Frezza, Warminster; Richard D. Conover, Richboro, both of Pa.; David Kaufman, Torrance, Calif.

[73] Assignee: General Instrument Corporation, New York, N.Y.

[21] Appl. No.: 726,676

[22] Filed: Apr. 24, 1985

[51] Int. Cl.⁵ ............................................. H04L 9/00
[52] U.S. Cl. ....................................... 380/50; 380/10; 380/25; 358/84; 358/86; 455/2; 455/5; 455/6
[58] Field of Search ...................... 371/34, 53; 358/84, 358/86, 122; 364/200, 900; 178/22.09; 380/9, 10, 23, 24, 25, 59, 50; 455/2-6

[56] References Cited

U.S. PATENT DOCUMENTS

| | | | |
|---|---|---|---|
| 3,605,091 | 9/1971 | Tong | 371/34 |
| 3,805,234 | 4/1974 | Masters | 371/34 |
| 3,934,224 | 1/1976 | Dulaney et al. | 371/34 |
| 4,051,326 | 9/1977 | Badagrani et al. | 364/900 |
| 4,054,911 | 10/1977 | Fletcher et al. | 358/86 |
| 4,070,648 | 1/1978 | Mergenthaler et al. | 371/34 |
| 4,159,468 | 6/1979 | Barnes et al. | 371/53 |
| 4,351,059 | 9/1982 | Gregoire et al. | 371/34 |
| 4,446,519 | 5/1984 | Thomas | 364/200 |
| 4,533,948 | 8/1985 | McNamara et al. | 358/122 |

FOREIGN PATENT DOCUMENTS 0036172 9/1981 European Pat. Off. .
0106213 4/1984 European Pat. Off. .
3417143 11/1984 Fed. Rep. of Germany .

OTHER PUBLICATIONS

IBM Technical Disclosure Bulletin, vol. 23, No. 1, Jun. 1980, pp. 232–234, IBM Corp., New York, U.S.; R. F. Cantor: "Encrypted Message Check Bits as Intelligent ID Card Signature".

AFIPS Conference Proceedings—1979 National Computer Conference, New York, 4th–7th 1979, vol. 48, pp. 821–829, AFIPS Press, New Jersey, U.S.: H. M. Wood, et al.: "Access Control Mechanisms for a Network Operating System."

IBM Technical Disclosure Bulletin, vol. 27, No. 4B, Sep. 1984, p. 2681, IBM Corp., New York, U.S.; R. E. Abernathy et al: "Access Protection Mechanism".

Primary Examiner—Stephen C. Buczinski
Assistant Examiner—Bernarr Earl Gregory
Attorney, Agent, or Firm—Barry R. Lipsitz

[57] ABSTRACT

Apparatus and a method are disclosed to enable on-line modification and upgrading of terminal software in a communication network while maintaining the integrity of communication between a service provider and a subscriber using the network. Software is downloaded on a booter channel on the communication network. A subscriber terminal, coupled to the network initiates a communication with the network to receive downloaded booter data. The downloaded data is stored, and a checksum is computed from at least a portion of the downloaded data. The checksum is tested for validity, and control of the subscriber terminal is released to the downloaded software only if the checksum is valid.

12 Claims, 3 Drawing Sheets

BOOTSTRAP CHANNEL SECURITY ARRANGEMENT FOR COMMUNICATION NETWORK

FIELD OF THE INVENTION

This invention relates to digital communication utilizing a communication network, for example a two-way cable television (CATV) network.

BACKGROUND OF THE INVENTION

Communication networks providing for bi-directional communication are well-known. An example of such a network, embodied in a CATV communication system, is provided in commonly assigned co-pending U.S. patent application Ser. No. 06/373,765, filed Apr. 30, 1982, now U.S. Pat. No. 4,533,948 entitled "CATV Communication System", and incorporated herein by reference (hereinafter, "the co-pending application").

The pending application referred to discloses a communication network built around frequency agile modems accessing multiple medium speed (128 kbp/s) channel pairs which are frequency division multiplexed into the available RF spectrum. Each channel pair comprises an upstream communication channel and a downstream communication channel. Each channel can carry a plurality of different signals through well known channel sharing techniques, such as that known as "CSMA/CD" and described in the copending application. This approach, as contrasted with the high speed (10 Mbp/s) baseband approach which is inherently distance limited, is not only compatible with standard CATV systems but has the geographic reach to cover even the largest CATV trunk runs (up to 30 miles).

Various applications are envisioned for such communication networks. Such applications include consumer or commercial services such as home banking, electronic mail and newspapers, shop at home, and the like. A provider of such services can couple its computers to the communication network so that the services can be accessed by a subscriber using an appropriate terminal ("subscriber terminal") coupled to the network. In providing such services, it is essential that security be provided. For example, a home banking customer must be able to accomplish transactions without divulging his personal identification number or other password to an intruder who may be monitoring the communication network.

A subscriber terminal may take several different forms, ranging from one with no intelligence to a "smart terminal" with the ability to complete various tasks locally. Smart terminals are desirable because they can relieve the communication network and its associated controllers from tasks which do not relate strictly to the provision of communication services. The operating system, communications protocol software, display package, and user interface software for the smart terminal can be provided on a disk or other storage medium used with the terminal, can be fixed in read only memory (ROM) installed in the terminal, or downloaded into random access memory (RAM) each time the terminal is powered up. The latter approach is advantageous in that system software can be modified, and each new release distributed via one of the channels of the communication network to each subscriber terminal. This approach enables a system operator to upgrade the software in literally hundreds of thousands of terminals merely by providing new software to be downloaded via the communication network. Thus, terminal products can evolve in place, rather than being made obsolete by changing market demands. An additional benefit of this approach is the ability to page individual software modules off of network channels on demand, reconfiguring subscriber terminals to optimally support a wide variety of diverse applications depending on what a given subscriber desires to do at a particular moment.

A potential problem may arise, however, with the downloading of software into subscriber terminals. In particular, a system intruder could download fraudulent software into a subscriber terminal, which data would be used to take control of the terminal without knowledge by the system operator or the subscriber. The intruder could then access a subscriber's bank account, shop at home account, or conduct other transactions and thereby steal funds, goods, and services.

It would be advantageous to provide a communication network which enables software to be downloaded into subscriber terminals without opening the network to intrusion by an unscrupulous third party. The present invention relates to apparatus and a method for providing such a communication network.

SUMMARY OF THE INVENTION

In accordance with the present invention, apparatus is provided for enabling on-line modification and upgrading of terminal software in a communication network, while maintaining the integrity of communication between a service provider and a subscriber using the network. The apparatus includes booter means for downloading software via the communication network. A subscriber terminal, coupled to the communication network, includes means for initiating a communication with the network to receive data downloaded from the booter means, means for storing data downloaded from the booter means, and means for computing a checksum from at least a portion of data downloaded from the booter means. Means are also provided for testing the checksum for validity, and releasing control of the subscriber terminal to software downloaded from the booter means only if the checksum is valid.

The subscriber terminal can further include a secret encryption key. Network control center means is provided for maintaining a record of the secret encryption key, whereby encrypted communication between the subscriber terminal and the network control center means can take place with the encryption based upon the secret encryption key. The checksum computed by the subscriber terminal can be encrypted using the secret encryption key and communicated over the communication network to the network control center means. Means associated with the network control center decrypts the encrypted checksum to enable verification thereof.

Alternately, the network control center means can store a valid checksum corresponding to data downloaded from the booter means. This checksum can be encrypted with the secret encryption key, and communicated to the subscriber terminal via the communication network. The subscriber terminal would then decrypt the encrypted checksum and determine whether it matches the checksum computed by the subscriber terminal.

A method is provided in accordance with the present invention for preventing unauthorized parties from infiltrating and controlling a communication network in which a booter image is downloaded to subscriber terminals. A portion of data is embedded in a booter image for use in computing a checksum. The booter image is downloaded into a subscriber terminal, and a checksum computed. The proper checksum which should result from the booter image is also computed. The checksum computed by the subscriber terminal is compared to the proper checksum and control of the subscriber terminal is released to the downloaded booter image only if the checksums match. The checksum computation data can be changed on a periodic basis to frustrate efforts by an intruder to outsmart the system.

DETAILED DESCRIPTION OF THE INVENTION

Figure 1:
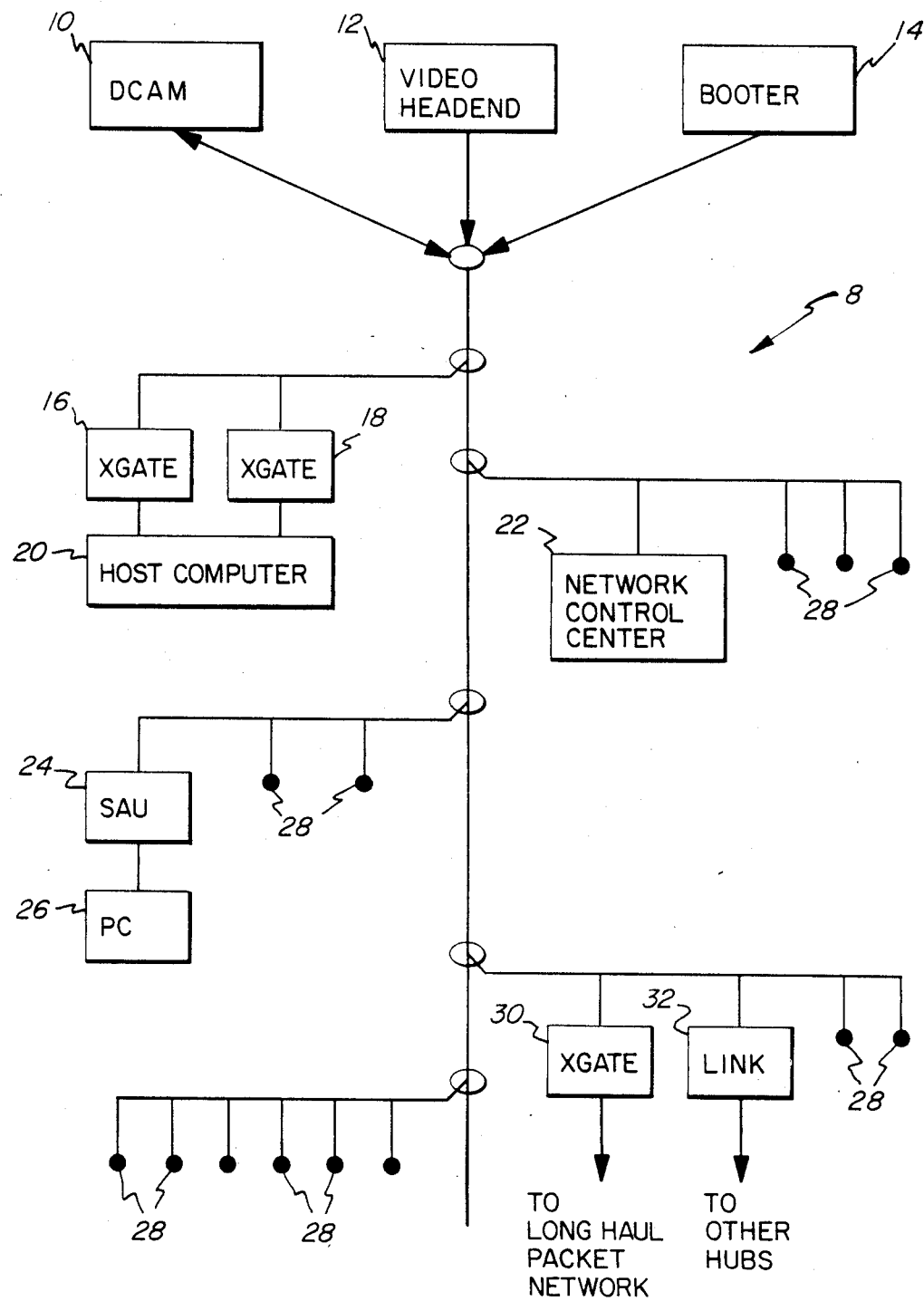
FIG. 1 is a block diagram of a communication network embodying the present invention.

FIG. 1 is a block diagram of a communication network 8 (which, for purposes of illustration, is a cable television network) embodying the present invention. A video headend 12 is coupled to the network to transmit television signals. The network shown is a single hub tree-and-branch cable system which achieves two-way connectivity through an intelligent headend packet repeater called a data channel access monitor (DCAM) 10. The DCAM maps up to fifty 300 KHz wide, 128 kbps upstream data channels into an equivalent number of downstream data channels, thereby transforming two unidirectional physical data paths into a single bi-directional logical data path. These channels are then used as a global bus by all devices on the network, which can tune their modems to any given channel pair. Packets transmitted upstream by any terminal coupled to the network are received by DCAM 10, demodulated to clean up accumulated noise, checked for valid authorization headers via a table look up, and retransmitted on the associated downstream channel (assuming a properly encrypted authorization code is present). The retransmitted packet is received by all devices currently tuned to that channel, but is only accepted and decoded by the particular device to which it is addressed. Thus, full point-to-point communication can be achieved between any two locations on the cable system.

Multiple data sessions can share a single data channel using a standard contention scheme such as CSMA/CD (carrier sense multiple access with collision detection), which efficiently distributes the available channel throughput without sacrificing instantaneous transmission speed or response times.

A network control center (NCC) 22 is responsible for taking the raw communication capability of the network and organizing and managing it. For example, NCC 22 handles the billing of subscribers who use the network. Further, NCC 22 establishes sessions between host computers operated by service providers and subscriber terminals by assigning data channels to be used for each session. An authorization check is also provided by NCC 22 to ensure that the users requesting service are, in fact, valid subscribers with paid-up accounts. Another function of NCC 22 is to distribute traffic among the available channels, and to keep traffic statistics. NCC 22 can be located anywhere on network 8, and does not have to be trunked into the headend.

A host computer 20, typically operated by a service provider, gains access to network 8 via Xgates 16, 18 which provide a standard X.25 interface to the host computer's front end while transparently transforming all data traffic into the internal protocols used on the network Xgates can also be used to couple the network into long haul packet networks. An Xgate 30 is shown in FIG. 1 for this purpose. Such capability provides access to national data services such as those offered under the trademarks *The Source* and *CompuServe*. The network can be further expanded through links, such as link 32, for interconnection with other network hubs.

An additional network component provided in accordance with the present invention is booter 14 which is a one-way transmitter. This unit cyclically transmits up to fifty 300 KHz wide 128 kbps data streams composed of either downloaded software or actual information "frames" for display on subscriber terminals. The one-way booter channel, like the two-way channels, is accessed by the terminal under software control via proper tuning of an integral modem in the terminal. One or more booter channels are reserved for distribution of the basic terminal operating software. The remaining channels on the network are available to authorized service providers who can upload information or software products over the cable system for continuous, load independent distribution.

The provision of booter 14 provides a unique capability in the design of terminal products; namely, all terminals coupled to the network can be entirely software, rather than firmware based. The terminal operating system, communications protocol software, display package, and user interface software are all downloaded from booter 14 into RAM in the terminal each time the terminal is powered up. This differs significantly from prior art systems wherein such software was permanently burned into ROM. In the present system, each new release of system software is distributed from booter 14 via an appropriate booter channel, making it possible for a system operator to upgrade the software in subscriber terminals remotely.

An example of a subscriber terminal is the personal computer 26 coupled to network 8 through a subscriber access unit (SAU) 24. The SAU is an intelligent, frequency agile 128 kbps modem. It allows the connection of a customer owned terminal or personal computer via a standard RS-232 or backplane connection, depending on the configuration. Additional subscriber terminals, or other components such as host computers can be coupled to network 8 through any of the various nodes 28 illustrated.

The provision of a booter for downloading software into subscriber terminals has the drawback that a system intruder could download fraudulent software over the network, which data would be used to take control of a subscriber terminal without knowledge by the system operator or the subscriber. With such control, the intruder could access various subscriber accounts to conduct transactions not authorized by the subscriber. The present invention prevents an intruder ("attacker") from taking control of subscriber terminals.

Figure 2:
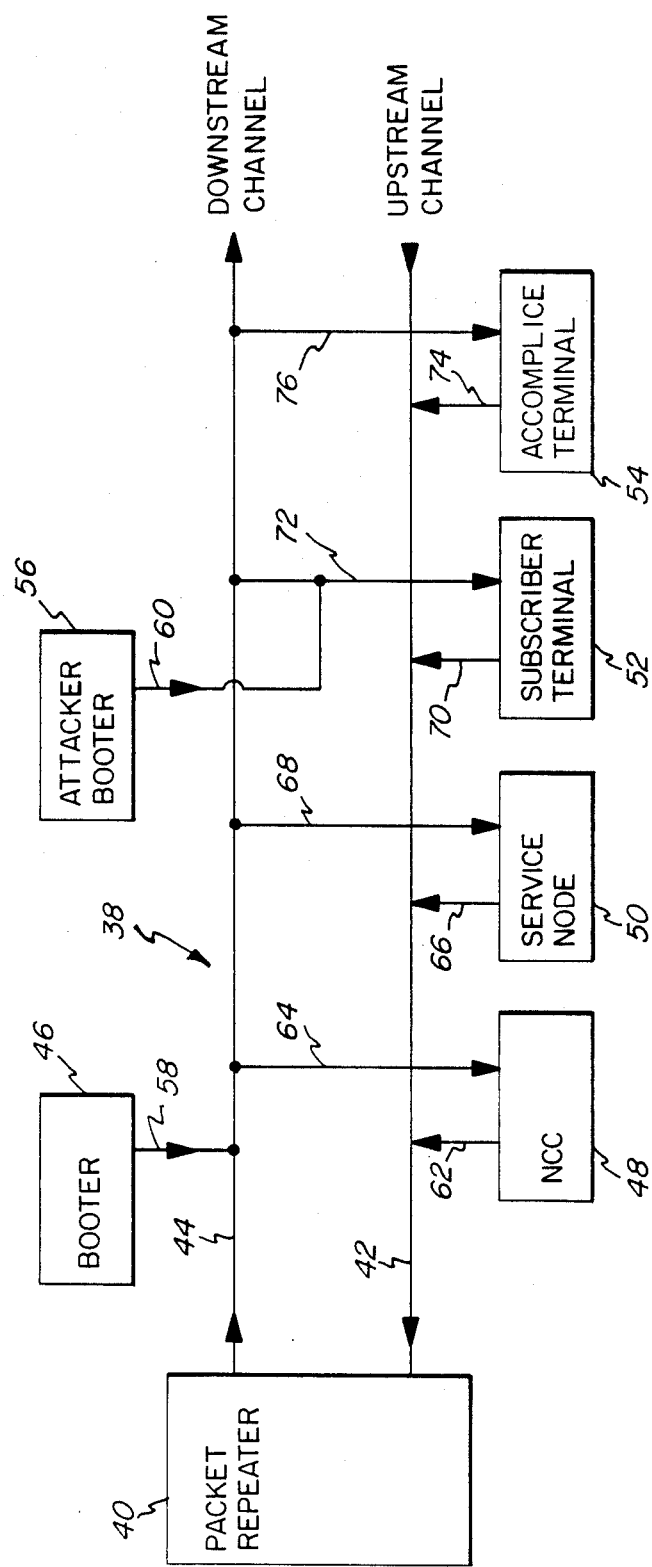
FIG. 2 is a more detailed block diagram of a communication network in accordance with the present invention illustrating the threat posed by a system intruder.

FIG. 2 shows how an attacker might try to take control of a subscriber's accounts. A communication network 38 includes an upstream channel 42 and downstream channel 44. A packet repeater 40 is provided to repeat data from upstream channel 42 on downstream channel 44. Legitimate booter 46 is coupled via a one-way path 58 to downstream channel 44 and transmits a legitimate booter image to be received by subscriber terminals. A subscriber terminal 52 is shown coupled to network 38 via path 70 (coupled to upstream channel 42) and path 72 (coupled to downstream channel 44). A network control center (NCC) 48 is coupled to upstream channel 42 via path 62, and downstream channel 44 via path 64. Similarly, service node 50 is coupled to upstream channel 42 via path 66, and downstream channel 44 via path 68.

In normal operation, network 38 operates as described above in connection with network 8 of FIG. 1. However, an attacker might attempt to infiltrate the system by coupling an attacker booter 56 to the downstream path 72 of subscriber terminal 52 via path 60. Without some means of security, fraudulent software could be downloaded from attacker booter 56 into subscriber terminal 52, enabling the attacker to take control of the terminal. Software downloaded by an attacker could be used to determine passwords and other relevant data for accounts belonging to the subscriber. Then, using an accomplice terminal 54 (coupled to upstream channel 42 via path 74 and downstream channel 44 via path 76) the attacker could access the subscriber's accounts to steal funds, goods, and services.

Figure 3:
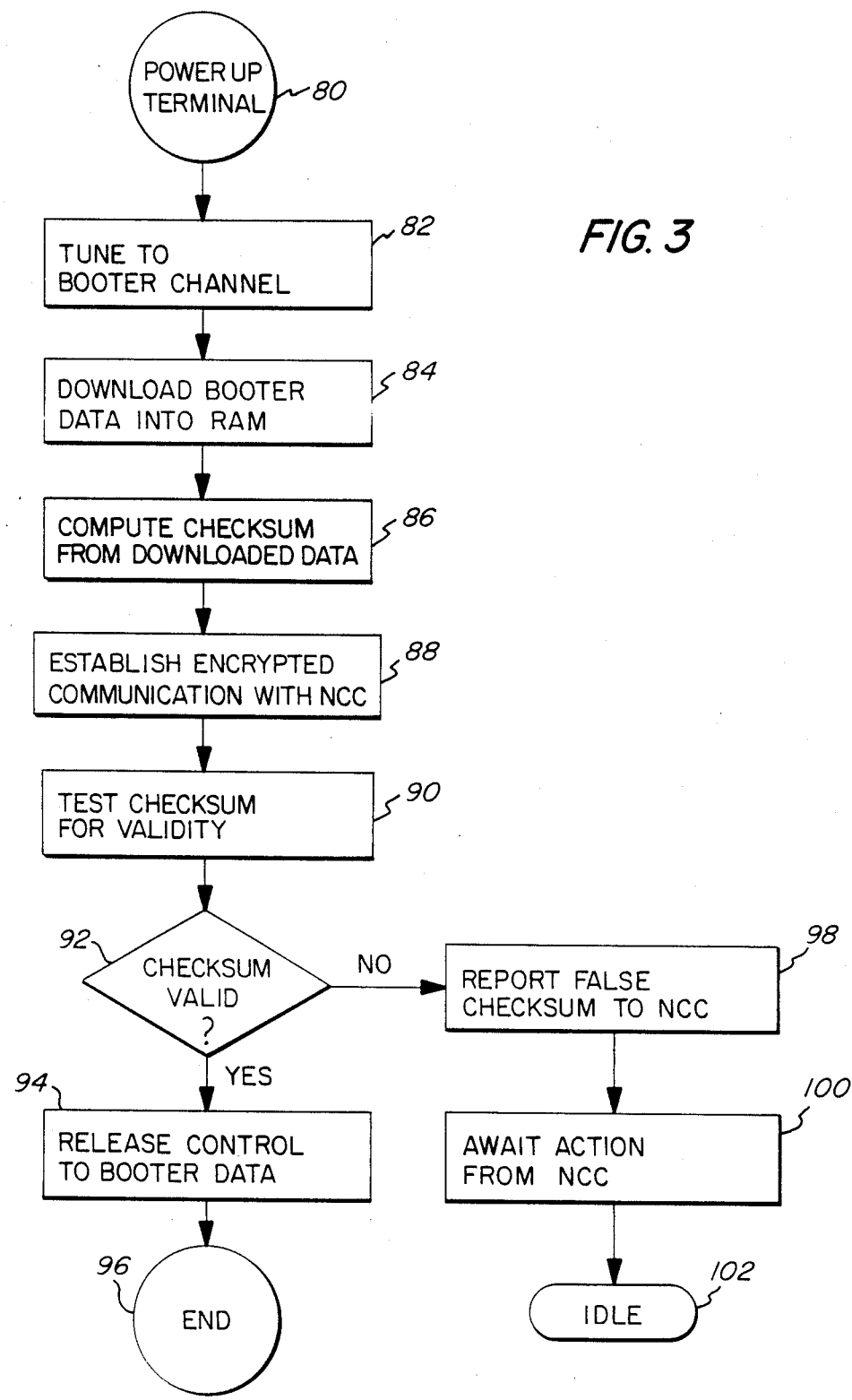
FIG. 3 is a flow chart illustrating the checksum verification routine used in the apparatus and method of the present invention.

In order to prevent such intrusion by an attacker, the present invention provides an apparatus and method for securing booter channel communication. The security arrangement is best described by referring to the flow chart of FIG. 3.

When a subscriber terminal is powered up as shown at box 80, a ROM based program tunes the terminal's modem to the booter channel for the network, as illustrated at box 82.

At this point, booter data will be downloaded into the subscriber terminal's RAM as indicated at box 84. At box 86, a checksum is computed from the downloaded data, or at least a portion of the downloaded data. The checksum can be computed using a cyclic redundancy code algorithm (CRC) well-known in the art. For example, a CRC-16 or CRC-24 algorithm can be used to compute the checksum. The computation of checksums in accordance with such algorithms is explained in detail in Tanenbaum, Andrew S., *Computer Networks*, Prentice-Hall, Inc., 1981, pages 128–132. Other checksum computing algorithms could alternately be used.

After the checksum has been computed, an encrypted communication is established with the network control center, as shown at box 88. Encryption can be based upon a secret encryption key ("secret node key") unique to the subscriber terminal which computed the checksum. The use of secret node keys and encrypted communication based thereon is disclosed in the co-pending application referred to above.

Briefly, in such an arrangement the network control center maintains a record of the secret encryption key of the subscriber terminal and uses the key for encrypting communications to the subscriber terminal and decrypting communications from the subscriber terminal. Similarly, the subscriber terminal uses the secret encryption key to encrypt communications to the NCC and decrypt communications from the NCC.

At box 90, the checksum is tested for validity. The validity test can be made at the subscriber terminal, at the network control center, or at a separate test facility coupled to the communication network. If the subscriber terminal is to perform the checksum test, the correct checksum for the downloaded booter image will be transmitted to the subscriber terminal in encrypted form from the NCC. The subscriber terminal will then decrypt the received checksum and compare it to the checksum computed by the subscriber terminal. Alternately, the subscriber terminal could encrypt the checksum it computed and compare it to the encrypted checksum received from the NCC.

If the NCC or a separate checksum test facility is to determine the validity of the checksum computed by the subscriber terminal, the subscriber terminal will encrypt the checksum it computed and transmit it to the NCC or other test facility. Again, the checksum computed by the subscriber terminal can be tested for validity in its encrypted form or can be decrypted prior to validity testing.

If, at box 92, the checksum is found to be valid, control passes to box 94 and control of the subscriber terminal is released to the downloaded booter data. The ROM based program then ends at box 96. If, on the other hand, the checksum is determined to be invalid at box 92, control passes to box 98 and the false checksum is reported to the NCC. At box 100, the subscriber terminal awaits action from the NCC, and goes into an idle condition at box 102.

When the NCC is informed that an invalid checksum has been computed by a subscriber terminal, a message is provided to the network operator so that appropriate investigation can commence. The existance of an invalid checksum can indicate that an attacker booter 56 (FIG. 2) was coupled to the subscriber terminal 52 in an attempt to access a subscriber's accounts.

In order to further frustrate an attacker's efforts to intrude, the portion of the booter image from which the checksum is computed can be changed on a periodic basis (e.g. daily). The use of a complicated checksum algorithm (such as CRC) makes it extremely difficult, if not impossible, to reverse engineer the booter image to enable an attacker to modify a fraudulent booter image such that the fraudulent image will cause the subscriber terminal to compute a valid checksum. The combination of the complicated checksum algorithm and periodic modification of the data needed to compute the checksum renders any attempt by an attacker to thwart the security arrangement virtually impossible. The periodic change made to the legitimate booter image can be very minor. For example, changing a single byte in the booter image will result in the computation of an entirely different checksum by the subscriber terminal.

What is claimed is:

1. Apparatus for enabling on-line modification and upgrading of terminal software in a communication network while maintaining the integrity of communication between a service provider and a subscriber using the network comprising:

booter means for downloading software via said communications network;

a subscriber terminal, coupled to said communication network, including:

a secret encryption key, means for initiating a communication with said network to receive data downloaded from said booter means, means for storing data downloaded from said booter means, and means independent of said downloaded data for computing a checksum from at least a portion of data downloaded from said booter means;

means for testing said checksum for validity;

means for preventing said subscriber terminal from executing software downloaded from said booter means unless the checksum is valid; and network control center means for maintaining a record of said secret encryption key, whereby encrypted communication between the subscriber terminal and network control center means can take place with the encryption based upon the secret encryption key.

2. The apparatus of claim 1 further comprising:

means for encrypting the checksum computed by said subscriber terminal using said secret encryption key;

means for communicating the encrypted checksum over said communication network to the network control center means; and means associated with said network control center means for decrypting the encrypted checksum to enable said checksum verifying means to verify the checksum for validity.

3. The apparatus of claim 1 further comprising means associated with said network control center means for storing a valid checksum corresponding to data downloaded from said booter means;

means associated with said network control center means for encrypting the stored checksum with said secret encryption key;

means for communicating the encrypted checksum to the communication network; and means associated with said subscriber terminal for receiving and decrypting the encrypted checksum for input to said verifying means, wherein said verifying means compares the decrypted checksum to the checksum computed by said subscriber terminal to verify proper correspondence thereof.

4. Apparatus for protecting a communication network having an upstream communication channel and a downstream communication channel from illegitimate access by an unauthorized party comprising:

booter means coupled to said downstream channel for downloading software via said communication network;

a subscriber terminal coupled to receive data from said downstream channel and transmit data on said upstream channel, said subscriber terminal including:

a secret encryption key, means for receiving and storing data downloaded from said booter means, means for computing a checksum from at least a portion of data downloaded from said booter means, and means for establishing an encrypted communication with said network wherein the encryption is based on sad secret encryption key;

network control center means coupled to said communication network and including a record of the secret encryption key for enabling encrypted communication with said subscriber terminal;

means for verifying the checksum computed by said subscriber terminal via an encrypted communication established between the subscriber terminal and network control center means; and means for releasing control of said subscriber terminal to data downloaded from said booter means only if the checksum is found to be valid.

5. The apparatus of claim 4 wherein the checksum computed by said subscriber terminal is encrypted and transmitted to said network control center means for decryption and verification.

6. The apparatus of claim 4 wherein said network control center means further comprises:

a record of the correct checksum for data downloaded from said booter means;

means for encrypting the correct checksum using said secret encryption key; and means for communicating the encrypted checksum to said subscriber terminal for comparison with the checksum computed by the subscriber terminal.

7. A communication network comprising:

at least one communication channel;

means for downloading data to a subscriber terminal coupled to said communication channel;

means for storing downloaded data in said subscriber terminal;

means for computing a checksum from at least a portion of downloaded data stored in said subscriber terminal;

means for testing the checksum for validity;

means for releasing control of said subscriber terminal to the downloaded data only if said checksum is valid; and network control center means coupled to said network for communicating with said subscriber terminal in an encrypted basis, so that checksum data can be passed between the network control center means and the subscriber terminal for validity testing without infiltration by an unauthorized party.

8. The communication network of claim 7 comprising a plurality of communication channels and means for tuning said subscriber terminal to a predetermined channel when the subscriber terminal is powered up to enable the subscriber terminal to receive data downloaded on the predetermined channel.

9. A terminal, for use in communicating on a communication network, comprising:

means for tuning to a booter channel on said network;

means for receiving and storing a booter image downloaded on the booter channel;

means for computing a checksum from at least a portion of data contained in said booter image;

means for establishing an encrypted communication with another device coupled to said network to determine whether the computed checksum is valid; and means for executing software contained in said booter image to access a desired service available on said network only if the checksum proves to be valid.

10. The subscriber terminal of claim 9 further comprising read only memory means for storing instructions used to access said booter image and compute and validate said checksum.

11. A method for preventing unauthorized parties from illegitimate access to a communication network in which a booter image is downloaded to subscriber terminals coupled to the network, comprising the steps of:

embedding in a booter image a portion of data for use in computing a checksum;

computing a checksum from booter image data downloaded into a subscriber terminal;

computing the proper checksum which should result from the booter image if the booter image is properly received by the subscriber terminal;

comparing the checksum computed from the booter image downloaded into the subscriber terminal with the checksum computed from the known booter image using a encrypted communication on said network; and releasing control of said subscriber terminal to the downloaded booter image only if the checksum computed by the subscriber terminal matches the proper checksum for the booter image.

12. The method of claim 11 comprising the further step of:

changing the checksum computation data embedded in said booter image on a periodic basis

* * * * *